April 28, 1970   R. E. UTTER   3,509,529
WARNING CIRCUIT
Filed Nov. 14, 1966

| LO – COOLANT TEMPERATURE | CONTINUOUS GREEN |
| HI – COOLANT TEMPERATURE | RELAY-BUZZER & CONTINUOUS RED |
| LO – OIL PRESSURE | CONTINUOUS RED |
| LO – FUEL SUPPLY | RELAY-BUZZER & FLASHING RED |

RAYMOND E. UTTER
INVENTOR.

BY John R. Faulkner
William E. Johnson
ATTORNEYS

United States Patent Office 3,509,529
Patented Apr. 28, 1970

3,509,529
WARNING CIRCUIT
Raymond E. Utter, Westland, Mich., assignor to Ford Motor Company, Dearborn, Mich., a corporation of Delaware
Filed Nov. 14, 1966, Ser. No. 594,070
Int. Cl. G08b 19/00, 7/00
U.S. Cl. 340—52                     6 Claims

ABSTRACT OF THE DISCLOSURE

This disclosure specifically relates to a warning circuit for indicating to the operator of a motor vehicle the occurrence of a low, a normal or a high coolant temperature, a low oil pressure and a low fuel supply. The circuit utilizes first and second indicator lights and a buzzer. Sensing elements are provided in the coolant supply system, in the motor oil supply system and in the motor fuel supply system of the vehicle. When a low temperature of the coolant is detected, the first indicator light is continuously lit. When a normal coolant temperature is detected, no lights in the system are lit. When a high coolant temperature is detected, the second indicator light is continuously lit and the buzzer is actuated. When a low oil pressure in the vehicle is detected, the second light is continuously lit. When a low fuel supply is detected, the second light is intermittently lit and the buzzer is actuated.

Figures 1, 2:
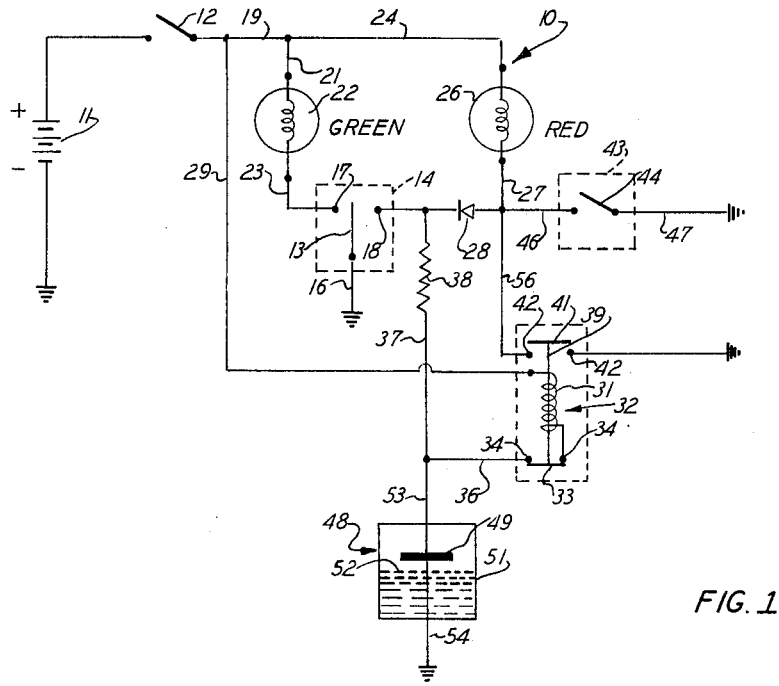

This invention relates to a warning circuit and, more particularly, to a warning circuit utilized in a motor vehicle having a motor coolant supply system, a motor oil supply system and a motor fuel supply system, for indicating to the operator of the vehicle the occurrence of a low, a normal or a high coolant temperature, a low oil pressure and a low fuel supply.

In a motor vehicle such as an automobile, it is desirable that certain conditions of the vehicle be indicated to the driver while the driver is operating the vehicle. More particularly, it is desirable to indicate to the driver the relative temperature of the coolant in the coolant supply system of the vehicle as well as such conditions as low oil pressure and low fuel supply respectively in the oil supply system and the fuel supply system of the vehicle. It is most desirable to indicate the aforementioned conditions to the driver by means of signals which are easily recognized by the driver and which are of such nature that they do not seriously distract the driver from operating the motor vehicle. The circuit of this invention is well suited for utilization as a warning circuit in an automobile to indicate to the driver such conditions as the relative temperature of the coolant, low oil pressure and low fuel supply.

The circuit of this invention is designed to indicate the above mentioned conditions of a motor vehicle to the driver thereof by selected audible and visual signals. More particularly, first and second indicator lights and a buzzer are selectively connected to a source of electrical energy by a detector of coolant temperature, oil pressure and fuel supply in such a manner that the first indicator light is lit to indicate a low coolant temperature, neither indicator light is lit to indicate a normal coolant temperature, the second indicator light is lit and the buzzer actuated to indicate a high coolant temperature, the second indicator light is lit to indicate a low oil pressure, and the second indicator light is intermittently lit and the buzzer actuated to indicate a low fuel supply.

It is a principal object of this invention to provide a warning circuit for giving a warning as to the occurrence of a specified one of a series of events.

It is another object of this invention to provide a warning circuit for a motor vehicle, which circuit provides an indication of the relative value of the coolant temperature utilized in the vehicle as well as indications of both low oil pressure and low fuel supply conditions in the vehicle.

It is still another object of this invention to provide a warning circuit for a motor vehicle which gives both visual and audible warnings of various conditions of the motor vehicle.

It is a further object of this invention to provide a warning circuit for utilization in a motor vehicle, which circuit is economical to build and efficient in operation.

Other objects and attendant advantages of the warning circuit of this present invention may be more readily realized when the specification is considered in conjunction with the attached drawings in which:

FIGURE 1 is a schematic circuit diagram of the warning circuit of this invention; and FIGURE 2 is a chart showing the manner in which a particular condition associated with a motor vehicle is indicated by the warning circuit.

Referring now to FIGURE 1, there is shown therein a schematic circuit diagram of the warning circuit of this invention as employed in a specific embodiment thereof to give warning indications of the occurrences of certain conditions in a motor vehicle. While the preferred embodiment of the circuit of this invention is described in conjunction with its use in a motor vehicle, it is understood that the circuit may be employed with other systems wherein it is desired to have a warning as to the occurrence of a specified one of a series of events.

In FIGURE 1, the warning circuit, generally indicated by the numeral 10, shows a battery 11 with the negative end thereof connected to ground and the positive end thereof connected to a key operated, ignition switch 12 of a motor vehicle. A bimetallic switch 13, of standard design, is located in the coolant supply system 14 of the motor vehicle and is connected to ground through a lead 16. The bimetallic switch 13 is immersed in the fluid utilized in the coolant supply system and is of such a type that it is in engagement with a first contact 17 until the coolant temperature exceeds 115° F., it is open when the coolant temperature is in the range between 115° F. and 245° F., and is in engagement with a second contact 18 when the coolant temperature exceeds 245° F.

When the motor vehicle is initially started, by closing the ignition switch 12, the bimetallic switch 13 is closed on the contact 17 because the coolant temperature is below 115° F. Thus, when the vehicle is started and a low coolant temperature exists therein, a circuit is completed from the battery 11 through the now closed ignition switch 12, leads 19 and 21, a green indicator light 22, a lead 23, the contact 17, the bimetallic switch 13 and the lead 16 to ground. In this manner, as indicated by the chart of FIGURE 2, the circuit of this invention provides a continuous green indication to warn the vehicle operator that the coolant temperature is below a preselected value.

If the coolant supply system of the motor vehicle overheats during the operation thereof, that is, the coolant temperature exceeds a temperature of approximately 245° F., the bimetallic switch 13 closes upon the contact 18. When the switch 13 closes, a circuit from the battery 11 is established through the ignition switch 12, the lead 19, a lead 24, a red indicator light 26, a lead 27, a diode 28, the contact 18, the bimetallic switch 13 and the lead 16 to ground whereby the red indicator light 26 is continuously lit. When the switch 13 closes upon the contact 18, a parallel circuit path is also completed from the battery 11 through the ignition switch 12, a lead 29, a coil 31 of a relay-buzzer, generally indicated by the numeral 32, a contact closing member 33 associated with normally closed contacts 34 of the buzzer, a lead 36, a lead 37, a resistor 38, the contact 18, the bimetallic switch 13 and the lead 16 to ground. When current flows through the coil 31 of the relay-buzzer 32, an armature 39 of the relay-buzzer is moved downwardly as viewed in FIGURE 1. The movement of the armature 39 causes a contact closing member 41 supported thereby to close normally open contacts 42 of the relay-buzzer while the contact closing member 33 also supported thereby opens its associated, normally closed contacts 34. As the contact closing member 33 of the relay-buzzer 32 opens its associated contacts 34, the power circuit to the relay coil 31 is interrupted thus causing the armature 39 to return to its normal position whereby contact closing member 41 only closes its associated contacts for a reatively short period of time. When the armature 39 returns to its normal position, the power circuit is again completed to the coil 31 and the relay-buzzer 32 is again operated. It is in this manner that a "chattering" of the relay-buzzer 32 is achieved and an audible indication is given to the operator of the motor vehicle. As indicated in the chart of FIGURE 2, the joint operation of the red indicator light 26, to give a continuous red indication, and the continuous operation of the relay-buzzer 32, to produce an audible indication, provides a warning to the operator that the coolant temperature of the motor vehicle has exceeded a preselected value. In the portion of the circuit just described, the resistor 38 is designed to limit the current flowing through the coil 31 of the relay-buzzer 32. The diode 28 is utilized to control the direction of flow of current in the circuit in a standard manner.

When the temperature of the coolant in the coolant supply system 14 is in a normal range, bimetallic switch 13 will not be in contact with either of its associated contacts 17 or 18. Thus, a normal temperature of the coolant supply system is indicated to the operator of the motor vehicle by a non-lighting of the indicator lights 22 and 26.

An oil pressure sensing unit 43, of standard design, is located in the oil supply system of the motor vehicle. The unit 43 is included in the circuit of this invention and operates in such a manner as to close a switch 44 thereof when the oil pressure of the vehicle drops below a required pressure level. Upon closing of the switch 44, a power circuit is completed from the battery 11 through the ignition switch 12, the leads 19 and 24, the red indicator light 26, the lead 27, a lead 46, the switch 44 and a lead 47 to ground. As indicated in the chart of FIGURE 2, the lighting of the red indicator light on a continuous basis warns the operator of the vehicle that the oil pressure in the oil supply system of the vehicle has fallen below a prescribed level.

A fuel sensing unit 48, of standard design, is located in the fuel supply system of the motor vehicle. The unit 48 includes a negative temperature co-efficient thermistor 49 located in the fuel tank 51 of the motor vehicle. The thermistor 49 is of such a nature that when the fuel 52, contained in the tank 51, falls below a prescribed level and leaves the thermistor 49 exposed, thereby no longer taking heat away from the thermistor by conduction, the thermistor will heat up and its resistance will drop. When the resistance of the thermistor 49 falls below a prescribed level, sufficient current will flow from the battery 11 through the ignition switch 12, the lead 29, the coil 31 of the relay-buzzer 32, the normally closed contacts 34 and contact closing member 33, the lead 36, a lead 53, the thermistor 49 and a lead 54 to ground to operate the relay-buzzer 32. In such a manner, the relay-buzzer 32 is actuated momentarily to move its associated armature 39 downwardly, as viewed in FIGURE 1, so that the contact closing member 41 associated therewith momentarily closes its associated, normally opened contacts 42. Upon closure of the normally opened contacts 42, a circuit is completed from the battery 11 through the switch 12, the leads 19 and 24, the red indicating light 26, the lead 27, a lead 56, the contacts 42 and contact closing member 41, whereby the red indicating light 26 is energized. Since movement of the armature 39 of the relay-buzzer 32 opens the circuit to the coil 31, the relay-buzzer 32 is operated only momentarily. The armature 39 returns to its normal position, and the contact closing member 33 recloses its associated contacts 34 thereby re-establishing a power circuit to coil 31 whereby the relay-buzzer 32 is again operated. In such a manner, the red indicator light 26 is flashed by the repeated actuation and de-actuation of the relay-buzzer 34. Also, as the relay-buzzer 32 opens and closes, an audible indication is conveyed to the vehicle operator. Thus, as shown in the chart in FIGURE 2, when the fuel supply of the motor vehicle falls below a prescribed level, the operator of the vehicle is warned of the condition by a flashing of the red indicator light along with an audible signal from the relay-buzzer.

The following circuit component may be utilized in the circuit of this invention. These specific circuit components are illustrated only, and it should be understood that other similar components may be utilized in the circuit.

Temperature Sensing Unit 14—C5AF–10B843–A (Ford Part Number)

Oil Pressure Sensing Unit 43—C7AF–9278–A (Ford Part Number)

Fuel Supply Sensing Unit 48—C4UF–9E293–A (Ford Part Number)

Diode 28—N4003 (Motorola)

Relay-Buzzer 32—KRP 11D (Potter-Bromfield Company)

It is thus seen that the circuit of this invention provides several distinct warning indications to the operator of a motor vehicle. These indications are both audible and visual, and by intermixing the audible and visual indications, the vehicle operator can readily distinguish which condition of his vehicle needs attention. The warning circuit employs a minimum number of electrical components and makes maximum utilization of the dominant red warning light by employing it in the three most critical warning signals which the circuit gives to the vehicle driver. The circuit is reliable in operation and extremely economical to manufacture.

What is claimed is:

1. A circuit for utilization in a motor vehicle having a motor coolant supply system, a motor oil supply system and a motor fuel supply system, for indicating to the operator of the vehicle the occurrence of a low, a normal or a high coolant temperature, a low oil pressure and a low fuel supply, which circuit comprises:

a green indicator light;

a red indicator light;

a relay-buzzer intermittently operated when actuated for giving an intermittent, audible signal;

a source of electrical energy;

a temperature sensing means located in the coolant supply system of the motor vehicle for detecting low, normal and high temperatures of the coolant;

first circuit means controlled by said temperature sensing means for connecting said green indicator light to said source of electrical energy only when said temperature sensing means detects a low coolant temperature whereby said green indicator light is continuously lit to indicate a low coolant temperature, said temperature sensing means also for disconnecting said green indicator light from source of electrical energy when said temperature sensing means detects a normal coolant temperature whereby the nonlighting of said green and said red indicator lights indicates a normal coolant temperature;

second circuit means controlled by said temperature sensing means for connecting said red indicator light and said relay-buzzer in parallel circuit arrangement with said source of electrical energy only when said temperature sensing means detects a high coolant temperature whereby said red indicator light is continuously lit and said buzzer gives an intermittent audible signal to indicate a high coolant temperature;

a pressure sensing means located in the oil supply system of the motor vehicle for detecting a low pressure of the oil;

third circuit means controlled by said pressure sensing means for connecting said red indicator light to said source of electrical energy when said pressure sensing means detects a low oil pressure whereby said red indicator light is continuously lit to indicate a low oil pressure;

fuel supply sensing means located in the fuel supply system of the motor vehicle for detecting a low supply of fuel; and fourth circuit means controlled by said fuel sensing means for connecting both said relay-buzzer and said red indicator light through said intermittently operated, relay-buzzer to said source of electrical energy when said fuel supply detecting means detects a low supply of fuel whereby said red indicator light is intermittently lit and said relay-buzzer gives an intermittent audible signal to indicate a low fuel supply.

2. A circuit for utilization in a motor vehicle having a motor coolant supply system, a motor oil supply system and a motor fuel supply system, for indicating to the operator of the motor vehicle the occurrence of a low, a normal or a high coolant temperature, a low oil pressure and a low fuel supply, which circuit comprises:

a green indicator light;

a red indicator light;

a relay-buzzer having a coil and an armature associated therewith cyclically movable from normally closed to normally open contacts when said relay-buzzer is actuated, said relay-buzzer for giving an intermittent, audible signal when actuated;

a source of electrical energy;

a temperature sensing means located in the coolant supply system of the motor vehicle for detecting low, normal and high temperatures of the coolant;

first circuit means controlled by said temperature sensing means for connecting said green indicator light to said source of electrical energy only when said temperature sensing means detects a low coolant temperature whereby said green indicator light is continuously lit to indicate a low coolant temperature, and for disconnecting said green indicator light from said source of electrical energy when said temperature sensing means detects a normal coolant temperature whereby the nonlighting of said green and said red indicator lights indicates a normal coolant temperature;

second circuit means controlled by said temperature sensing means for connecting said red indicator light and said relay-buzzer through its coil and normally closed contacts in parallel circuit arrangement with said source of electrical energy only when said temperature sensing means detects the occurrence of a high coolant temperature whereby said red indicator light is continuously lit and said buzzer gives an intermittent, audible signal to indicate a high coolant temperature;

a pressure sensing means located in the oil supply system of the vehicle for detecting a low pressure of the oil;

third circuit means controlled by said pressure sensing means for connecting said red indicator light in series with said source of electrical energy only when said pressure sensing means detects a low oil pressure whereby said red indicator light is continuously lit to indicate a low oil pressure;

fuel supply sensing means located in the fuel supply system of the motor vehicle for detecting a low supply of fuel; and fourth circuit means controlled by said fuel sensing means for connecting both said relay-buzzer and said red indicator light through said normally open contacts of said relay-buzzer to said source of electrical energy when said fuel supply detecting means detects a low supply of fuel whereby said red indicator light is intermittently lit and said relay-buzzer gives an intermittent, audible signal to indicate a low fuel supply.

3. The circuit defined in claim 2 wherein:

said fuel sensing means located in the fuel supply system of the motor vehicle includes a thermistor having a negative temperature co-efficient of resistance such that when fuel does not suround the thermistor to dissipate the heat created therein, the resistance of the thermistor decreases substantially; and wherein said fourth circuit means includes means for connecting said thermistor through the normally closed contacts of said relay-buzzer and the coil of said relay-buzzer to said source of electrical energy whereby when the resistance of the thermistor is substantially reduced because fuel does not surround the same, sufficient current will flow through said coil to operate said relay-buzzer such that said red indicator light is intermittently lit and said relay-buzzer gives an intermittent, audible signal to indicate a low fuel supply.

4. A circuit for utilization in a motor vehicle having a motor coolant supply system, a motor oil supply system and a motor fuel supply system, for indicating to the operator of the vehicle the occurrence of a low, a normal or a high coolant temperature, a low oil pressure, and a low fuel supply, which circuit comprises:

first and second indicator lights;

a buzzer;

a source of electrical energy;

detecting means for detecting a low, a normal or a high coolant temperature, a low oil pressure and a low fuel supply, respectively, in the motor coolant supply system, the motor oil supply system and the motor fuel supply system of the motor vehicle; and circuit means controlled by said detecting means for selectively interconnecting said first indicator light, said second indicator light and said buzzer with said source of electrical energy in a manner such that when said detecting means detects a low coolant temperature said first indicator light is continuously lit, that when said detecting means detects a normal coolant temperature neither of said indicator lights is lit, that when said detecting means detects a high coolant temperature said second indicator light is continuously lit and said buzzer is actuated, that when said detecting means detects a low oil pressure said second indicator light is continuously lit and when said detecting means detects a low fuel supply said second indicator light is intermittently lit and said buzzer is actuated.

5. A circuit for utilization in a motor vehicle having a motor coolant supply system, a motor oil supply system and a motor fuel supply system, for indicating to the operator of the vehicle the occurrence of a low, a normal or a high coolant temperature, a low oil pressure and a low fuel supply, which circuit comprises:

first and second indicator lights;

a buzzer;

means for sensing a low, a normal and a high coolant temperature in the coolant supply system of the vehicle;

means controlled by said temperature sensing means for lighting said first indicator light when said temperature sensing means senses a low temperature, for lighting neither of said indicator lights when said temperature sensing means senses a normal temperature, and for lighting said second indicator light and actuating said buzzer when said temperature sensing means senses a high coolant temperature;

means for sensing a low oil pressure in said vehicle;

means controlled by said oil pressure sensing means for lighting said second light when said oil pressure sensing means senses a low oil pressure;

means for sensing a low supply of fuel; and means controlled by said fuel sensing means for intermittently flashing said second light and operating said buzzer when said fuel sensing means senses a low fuel supply.

6. A circuit for giving a warning as to the occurrence of a specified one of a series of events, which circuit comprises:

first and second indicator lights;

a relay-buzzer intermittently operated when actuated for giving an intermittent, audible signal;

a source of electrical energy;

a first detecting means for detecting first, second and third events of the series of events;

first circuit means controlled by said first detecting means both for connecting said first indicator light to said source of electrical energy only when said first detecting means detects the first event whereby said first indicator light is continuously lit to indicate the occurrence of the first event and for disconnecting said first indicator light from said source of electrical energy when said first detecting means detects the second event whereby the nonlighting of said first and said second indicator lights indicates the occurrence of the second event;

second circuit means controlled by said first detecting means for connecting said second indicator light and said relay-buzzer in parallel circuit arrangement with said source of electrical energy only when said first detecting means detects the occurrence of the third event whereby said second indicator light is continuously lit and said relay-buzzer gives an intermittent, audible signal to indicate the occurrence of the third event;

a second detecting means for detecting a fourth of the series of events;

third circuit means controlled by said second detecting means for connecting said second indicator light to said source of electrical energy when said second detecting means detects the fourth event whereby said second indicator light is continuously lit to indicate the occurrence of the fourth event;

third detecting means for detecting a fifth of the series of events; and fourth circuit means controlled by said third detecting means for connecting both said relay-buzzer and said second indicating light through said relay-buzzer to said source of electrical energy when said third detecting means detects the occurrence of the fifth event whereby said second indicator light is intermittently lit and said buzzer gives an intermittent, audible signal to indicate the occurrence of the fifth event.

References Cited

UNITED STATES PATENTS

| | | | |
|---|---|---|---|
| 3,237,156 | 2/1966 | Irvine | 340—27 |
| 3,304,441 | 2/1967 | Pelt | 340—233 |
| 3,392,379 | 7/1968 | Thomason et al. | 340—371 |
| 3,401,373 | 9/1968 | Risner | 340—52 |
| 3,432,840 | 3/1969 | Neapolitakis et al. | 340—59 |

JOHN W. CALDWELL, Primary Examiner

H. S. COHEN, Assistant Examiner

U.S. Cl. X.R.

340—60, 75, 228